(12) United States Patent
Roth

(10) Patent No.: US 10,491,586 B2
(45) Date of Patent: *Nov. 26, 2019

(54) INCORRECT PASSWORD MANAGEMENT

(71) Applicant: Amazon Technologies, Inc., Reno, NV (US)

(72) Inventor: Gregory Branchek Roth, Seattle, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/592,321

(22) Filed: May 11, 2017

(65) Prior Publication Data
US 2017/0244694 A1    Aug. 24, 2017

Related U.S. Application Data

(63) Continuation of application No. 14/719,419, filed on May 22, 2015, now Pat. No. 9,699,173.

(51) Int. Cl.
*H04L 29/06* (2006.01)
*G06F 21/45* (2013.01)
*G06F 21/31* (2013.01)

(52) U.S. Cl.
CPC ............ *H04L 63/083* (2013.01); *G06F 21/31* (2013.01); *G06F 21/45* (2013.01); *H04L 29/06* (2013.01);
(Continued)

(58) Field of Classification Search
CPC ................................ G06F 21/31; H04L 63/083
See application file for complete search history.

(56) References Cited

U.S. PATENT DOCUMENTS 8,302,187 B1 * 10/2012 Gupta .................. H04L 65/1079
                                                                   713/182
8,904,506 B1 * 12/2014 Canavor ................. H04L 29/06
                                                                   726/7
(Continued)

OTHER PUBLICATIONS

Non-Final Rejection issued in corresponding U.S. Appl. No. 14/719,419, dated Jun. 29, 2016, 11 pages.
(Continued)

*Primary Examiner* — James R Turchen
(74) *Attorney, Agent, or Firm* — Hogan Lovells US LLP

(57) ABSTRACT

The management of credentials subject to a lockout policy can include dynamically determining appropriate lockout thresholds and other such values appropriate for a current situation. For example, the number of incorrect password attempts allowed before an account lockout can be based at least in part upon the amount of time that has passed since a most recent password change. There might be an unlimited number of attempts allowed for a short period after a password change, followed by a decreasing number of permissible attempts over a subsequent period of time. In some embodiments the number of correct attempts received after a password change can affect the number of incorrect attempts allowed. Further, if an incorrect attempt matches a previously correct password then that attempt might not count toward the number of incorrect attempts compared against the threshold, at least for a determined period of time after a password change.

20 Claims, 7 Drawing Sheets

(52) U.S. Cl.
CPC .. *H04L 63/0846* (2013.01); *G06F 2221/2131* (2013.01)

(56) References Cited

U.S. PATENT DOCUMENTS

| | | | | |
|---|---|---|---|---|
| 9,231,962 | B1* | 1/2016 | Yen | H04L 63/1408 |
| 9,305,150 | B2* | 4/2016 | Buck | G06F 21/31 |
| 9,369,331 | B1* | 6/2016 | Gill | H04L 29/08072 |
| 9,870,456 | B2* | 1/2018 | Tieu | G06F 21/32 |
| 2002/0108046 | A1* | 8/2002 | Armingaud | G06F 21/31 |
| | | | | 713/183 |
| 2004/0164848 | A1* | 8/2004 | Hwang | G06F 21/32 |
| | | | | 340/5.82 |
| 2008/0066167 | A1* | 3/2008 | Andri | G06F 21/46 |
| | | | | 726/5 |
| 2008/0155651 | A1* | 6/2008 | Wasmund | G06F 21/316 |
| | | | | 726/2 |
| 2008/0313721 | A1* | 12/2008 | Corella | G06F 21/31 |
| | | | | 726/6 |
| 2009/0006856 | A1* | 1/2009 | Abraham | G06F 21/55 |
| | | | | 713/183 |
| 2010/0169952 | A1* | 7/2010 | Maki | H04L 63/0846 |
| | | | | 726/3 |
| 2010/0225443 | A1* | 9/2010 | Bayram | G06F 21/316 |
| | | | | 340/5.83 |
| 2010/0293608 | A1* | 11/2010 | Schechter | G06F 17/2785 |
| | | | | 726/8 |
| 2011/0185401 | A1* | 7/2011 | Bak | G06F 16/9024 |
| | | | | 726/5 |
| 2012/0311686 | A1* | 12/2012 | Medina | H04L 63/0807 |
| | | | | 726/7 |
| 2013/0254875 | A1* | 9/2013 | Sama | G06F 21/31 |
| | | | | 726/19 |
| 2016/0071201 | A1* | 3/2016 | Zhang | G06Q 40/00 |
| | | | | 705/35 |
| 2016/0080936 | A1* | 3/2016 | Rachuri | H04W 12/06 |
| | | | | 726/7 |
| 2016/0112262 | A1* | 4/2016 | Johnson | G06F 9/45504 |
| | | | | 709/221 |
| 2016/0112980 | A1* | 4/2016 | Pai | H04W 12/08 |
| | | | | 455/435.1 |
| 2016/0125522 | A1* | 5/2016 | Tang | G06Q 40/00 |
| | | | | 705/35 |
| 2016/0226853 | A1* | 8/2016 | Wall | H04L 63/083 |
| 2016/0292407 | A1* | 10/2016 | Tieu | G06K 9/00 |

OTHER PUBLICATIONS

Notice of Allowance issued in corresponding U.S. Appl. No. 14/719,419, dated Mar. 17, 2017, 13 pages.

* cited by examiner

INCORRECT PASSWORD MANAGEMENT

CROSS-REFERENCE TO RELATED APPLICATIONS

This application is a continuation of U.S. patent application Ser. No. 14/719,419, entitled "INCORRECT PASSWORD MANAGEMENT" filed May 22, 2015, which is hereby incorporated by reference in its entirety for all purposes.

BACKGROUND

The security of computing resources and associated data is of high importance in many contexts. As an example, organizations often utilize networks of computing devices to provide a robust set of services to their users. In many situations, access to these services and other network resources requires that a user provide some type of credential, often a password, to authenticate the user's identity and obtain authorization for that access through a user account or other such information. Because passwords can be stolen, guessed, or otherwise obtained by unauthorized parties, organizations often require users to periodically change or "rotate" their passwords over time. Often users will change passwords even if such change is not required, in order to improve security and reduce the risk of someone obtaining the current password.

In various systems, a maximum number of incorrect password attempts will be allowed, after which access may be locked out for a least a period of time. This has the advantage that an automated process cannot keep trying different passwords until successfully determining the correct password and gaining access. A disadvantage to such an approach is that a user can get inadvertently locked out of certain access due to incorrect password entry. For example, a user might frequently enter the prior password right after a password change due to muscle memory or simply forgetting the new password. Similarly, users often enter passwords into software applications and computing devices, particularly mobile devices, that automatically check for updated information, and the failure of a user to quickly update all such password entries can result in access getting quickly locked out as devices automatically submit requests with the old password.

BRIEF DESCRIPTION OF THE DRAWINGS

Various embodiments in accordance with the present disclosure will be described with reference to the drawings, in which.

DETAILED DESCRIPTION

Figure 1:
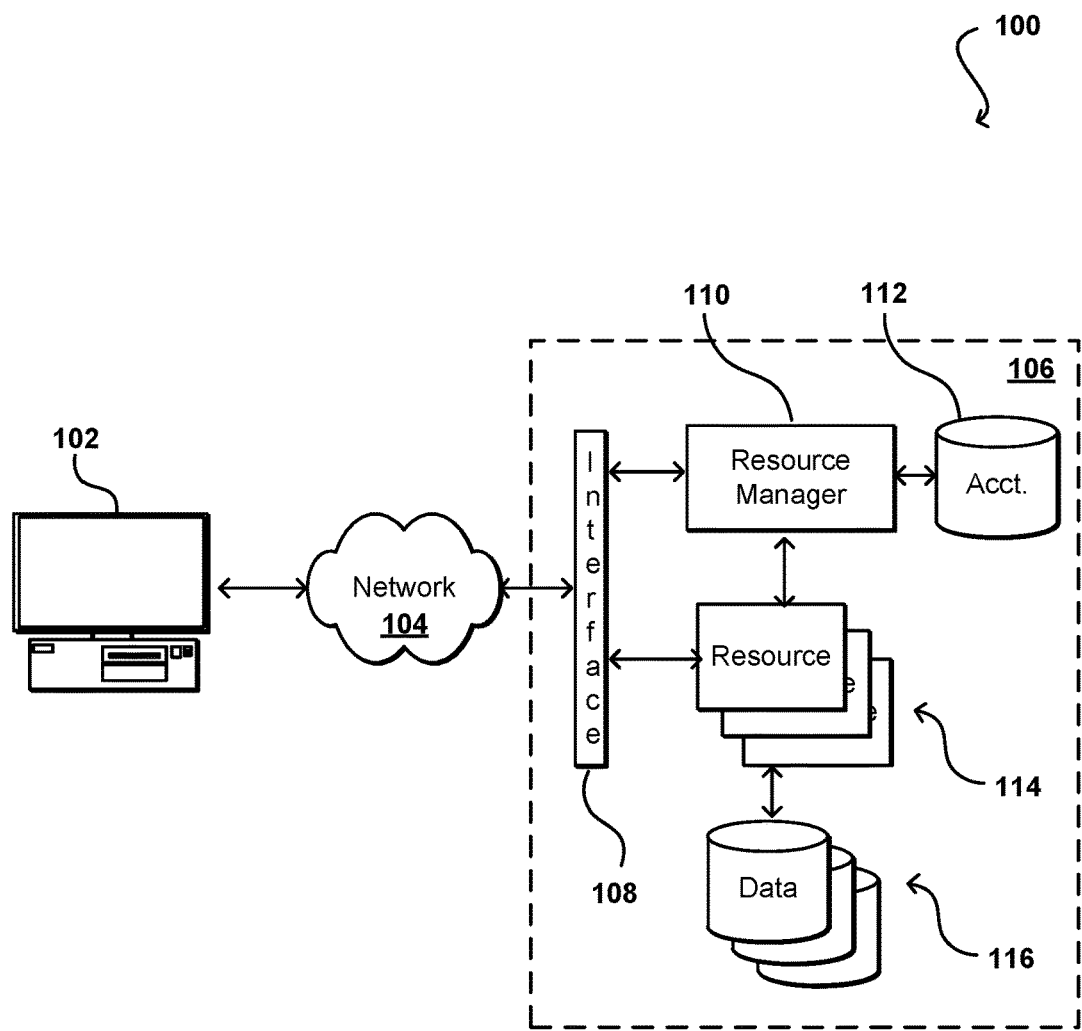
FIG. 1 illustrates an example environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of access to electronic resources, particularly where access to those resources is gained through presentation of a credential such as a password. A request for access can include a copy of the password, which can be compared against a current password for gaining the access, as may be associated with a user or account. In many cases the password may or will be changed over time, and the access may be subject to a lockout policy whereby a number of incorrect attempts received over a period of time can cause the access to be "locked out" or otherwise prevented for at least a period of time. In order to determine whether to lock out access, the number of incorrect attempts can be compared against an incorrect attempt threshold or other such value. While conventional processes can utilize a static or fixed threshold, approaches in accordance with various embodiments can utilize various types of data to dynamically determine appropriate threshold values for different situations or circumstances.

For example, in a first embodiment an incorrect attempt threshold is determined based at least in part upon an amount of time since a most recent password change. For a first period of time after the change there may be no limit, which can enable the user to adjust the password on various devices or for various applications that might attempt to automatically gain access. This prevents the user from being inadvertently locked out due to the inability to change the password in all appropriate locations in a timely fashion. There can be a second period of time over which the number of permissible incorrect attempts decreases, whether linearly, exponentially, or otherwise. For example, a user might be allowed up to ten incorrect attempts shortly after a password change but only three incorrect attempts sometime later. Once a minimum threshold value is obtained, that minimum value can carry forward as the value for subsequent attempts.

A second embodiment attempts to determine whether an incorrect password submission matches a previously valid password. An invalid attempt counter might be utilized that is updated (i.e., incremented or decremented from a determined count value) each time an incorrect password attempt is received, at least over a sliding window of time. Since a user is likely to enter the previously valid password accidentally soon after a password change, such attempts may be prevented from causing the counter to increment, at least for a determined period of time after a password change.

A third embodiment analyzes the amount of time since the password change, and the number of correct password attempts during that time period, in order to determine the appropriate incorrect attempt threshold. There might be an initial time period, either fixed or up until the first correct password attempt, whereby there might be a large (or even unlimited) number of incorrect password attempts allowed. After that period, an intermediate period can exist where the number of incorrect attempts permissible decreases over time up until a minimum threshold number of attempts is reached. During this period, the number of permissible incorrect attempts might also decrease with each correct attempt received. This can include, for example, dividing the current maximum threshold (as may be based on the amount of time elapsed) by the number of correct attempts received since the last password change.

Various other such functions can be used as well within the scope of the various embodiments as would be apparent to one of ordinary skill in the art in light of the teachings and suggestions contained herein.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
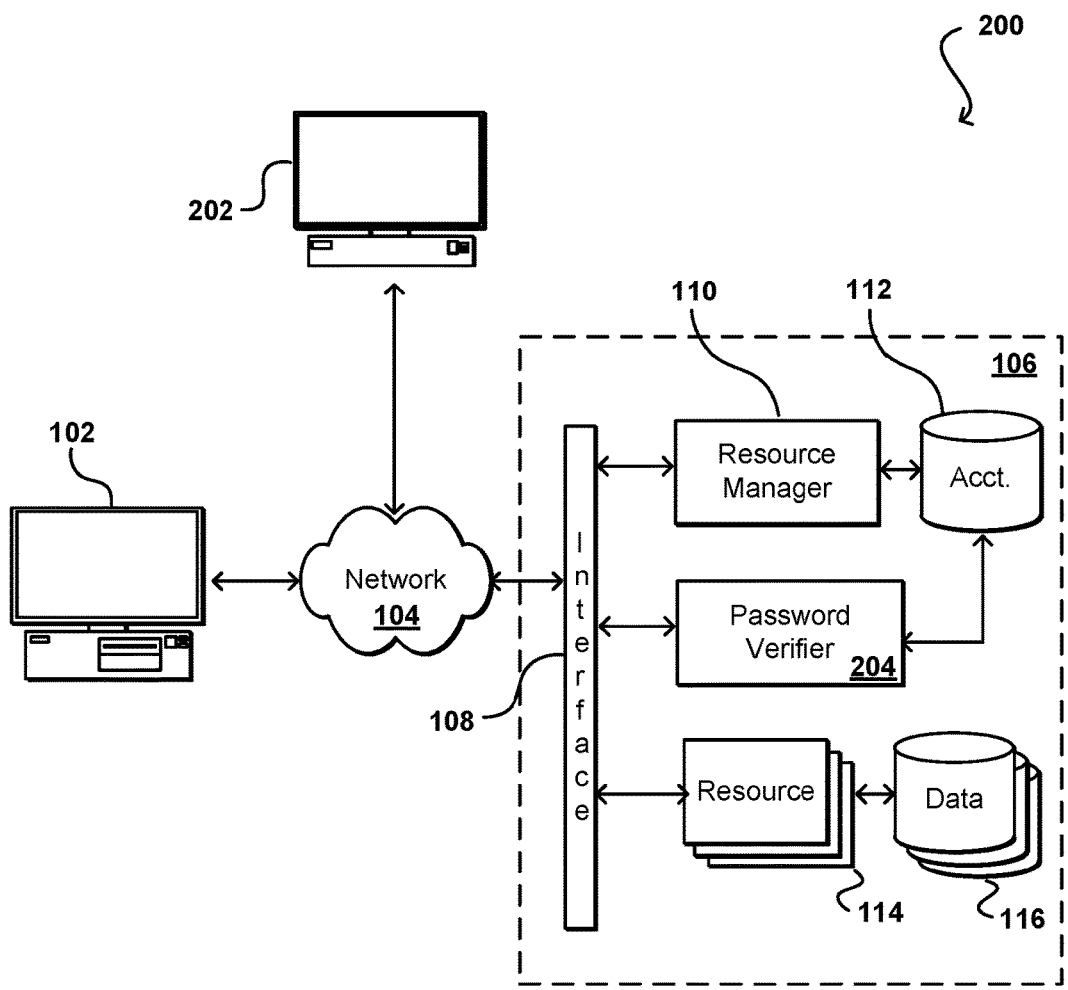
FIG. 2 illustrates an example environment where a password verifier component can utilize a dynamic password lockout process to determine whether to lockout an account in accordance with various embodiments.

While in an embodiment such as that discussed with respect to FIG. 1 a component such as the resource manager 110 or a component of the interface layer 108 might be tasked with password management, approaches in accordance with various embodiments can utilize an intelligent password verifier 204, such as illustrated in FIG. 2, to dynamically determine whether access should be locked or otherwise prevented based at least in part upon a received request. The password verifier 204 can be a software module, cloud service, or dedicated device or component, among other such options. Further, while the password verifier 204 is shown inside the resource environment 106, it should be understood that the password verifier could be outside the environment and/or provided by a third party, among other such options.

A password verifier 204 can be utilized to implement any of a variety of different password verification and/or management algorithms discussed and suggested herein. As mentioned, conventional algorithms typically provide for a fixed number of incorrect attempts over a period of time before a lockout is triggered. For many situations, such as where devices frequently check for updates using stored passwords that the user might have forgotten to update, such an approach can cause account access to quickly be locked, which can be undesirable for the user as well as those needing to unlock the accounts.

Approaches in accordance with various embodiments can overcome these and other disadvantages to conventional approaches by making intelligent and dynamic decisions as to whether to lock an account or take another such action in response to a received credential. For example, a user might utilize a first device 102 to update a password for an account, such as by submitting a request over at least one network 104 to an appropriate interface of a resource environment 106 as discussed with respect to FIG. 1. It might be the case, however, that the user has a second device 202 that has a copy of the previous password stored in order to automatically check for updates or otherwise gain access to the resource environment. In such a situation, the second device 202 might submit three requests over the course of a few minutes in an attempt to gain access. Using a conventional approach, this could cause access to be locked out for both devices. In this example, however, information for the request can be passed to a password verifier 204 that can analyze information relating to the most recent password change to determine whether to allow or prevent access, as well as whether to lock the account for an incorrect attempt. This can include, for example, determining whether to count the attempt as an incorrect attempt for lockout purposes, as well as determining the appropriate lockout threshold for the current situation.

Figure 3:
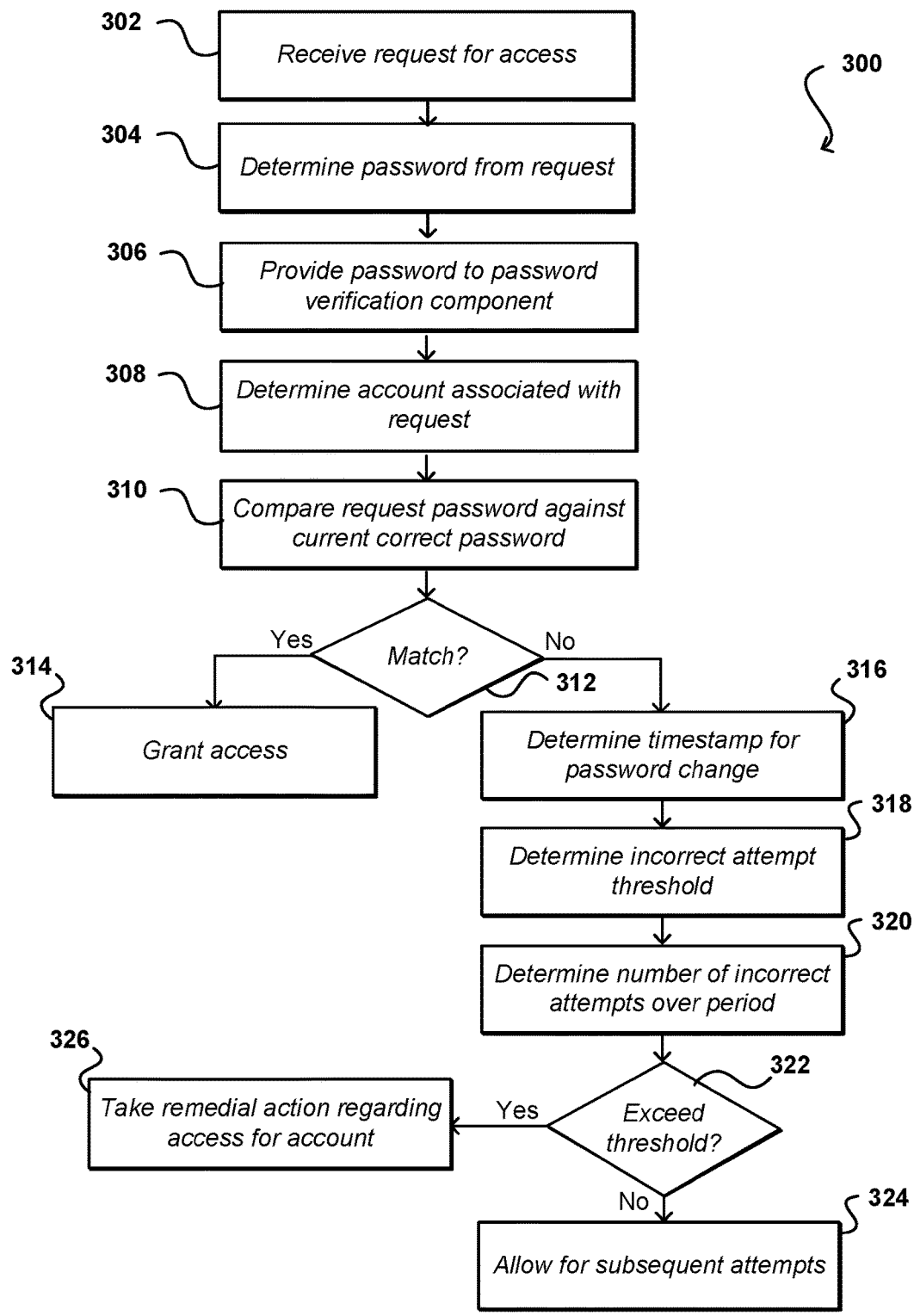
FIG. 3 illustrates an example process for determining a lockout threshold based at least in part upon time since a password change, which can be utilized in accordance with various embodiments.

FIG. 3 illustrates an example process 300 for determining whether to lock an account, in response to receipt of an incorrect password, that can be utilized in accordance with various embodiments. It should be understood that, for this and other processes discussed herein, there can be additional, fewer, or alternative steps, performed in similar or alternative orders, or in parallel, within the scope of the various embodiments unless otherwise stated. In this example, a request is received 302 that includes a password (or other such credential) to be used in obtaining access to a particular system, service, device, data set, or other such resource. The password can be extracted or otherwise determined 304 from the request and provided 306 to a password verification component or other password verifier as discussed herein. An account associated with the request can be determined 308, such as by comparing a username or other identifier associated with the request against an account lookup table or other such data set. In many instances a request for access will include at least an indication of an identity or an account for which an access determination is to be performed, such as by determining a password or credential associated with that user or account for the requested type of access. The credential to be used for the determination might be the password itself, some value derived from the password such as a hash of the password, an execution of a challenge/response protocol with respect to a password, or an execution of a SRP (secure remote password), among other such options. The request password can be compared 310 against the current password for the account to determine whether the passwords match. In most cases, the passwords will be determined to "match" when the request password exactly corresponds to the account password, such as may include corresponding characters, character case, symbols, and the like in the same order. In other cases capitalization may not matter, among other such option. If the passwords are determined to match 312, the access can be granted 314 for the request.

If it is determined that the passwords do not sufficiently match, a time stamp (or other time indicator) can be determined 316 that identifies the last time at which a password change was made for the account, at least with respect to the type of access being requested. Based at least in part upon the time stamp, as well as the amount of time that has passed since the time of the time stamp, an incorrect attempt threshold can be determined 318. This threshold can be determined using any appropriate function, such as a linear function, step function, exponential function, and the like. For example, in one embodiment there might be no restriction on the number of incorrect attempts within three hours of a password change. From the three hour period until the end of a three day period, for example, the number of allowable incorrect password attempts before lockout can decrease accordingly, with a set number (such as three) being allowed after the three day period. The threshold number of attempts can also apply over a period of time (i.e., floating window), such as within five minutes of each other. The length of the window of time can also vary with time in at least some embodiments.

A number of incorrect password requests received over the relevant period of time can be determined 320. This information might be stored in cache memory or in a data store, for example, such as may include a set of timestamps along with values such as the incorrect password attempted, an IP address associated with the request, and/or other such data. A determination can be made 322 as to whether the number of incorrect attempts over the period exceeds (or in some embodiments at least meets) the incorrect attempt threshold, such as where a fourth incorrect attempt is received for a threshold of three incorrect attempts over a five minute period. If the number of incorrect attempts does not exceed the threshold, then the account can remain open and additional attempts can be allowed 324. If, however, the number of incorrect attempts over the period exceeds the threshold, one or more remedial actions can be taken 326. This can include, for example, locking out the account for at least a determined period of time, whereby access to the account cannot be obtained through submission of a password request, at least through the same device or from the same address, etc. The length of the lockout might be based upon factors such as the amount of time since a password change or the number of lockouts associated with the customer account, among other such options. Other remedial actions can include, for example, providing a limited amount or type of access to some or all relevant resources.

Figure 4:
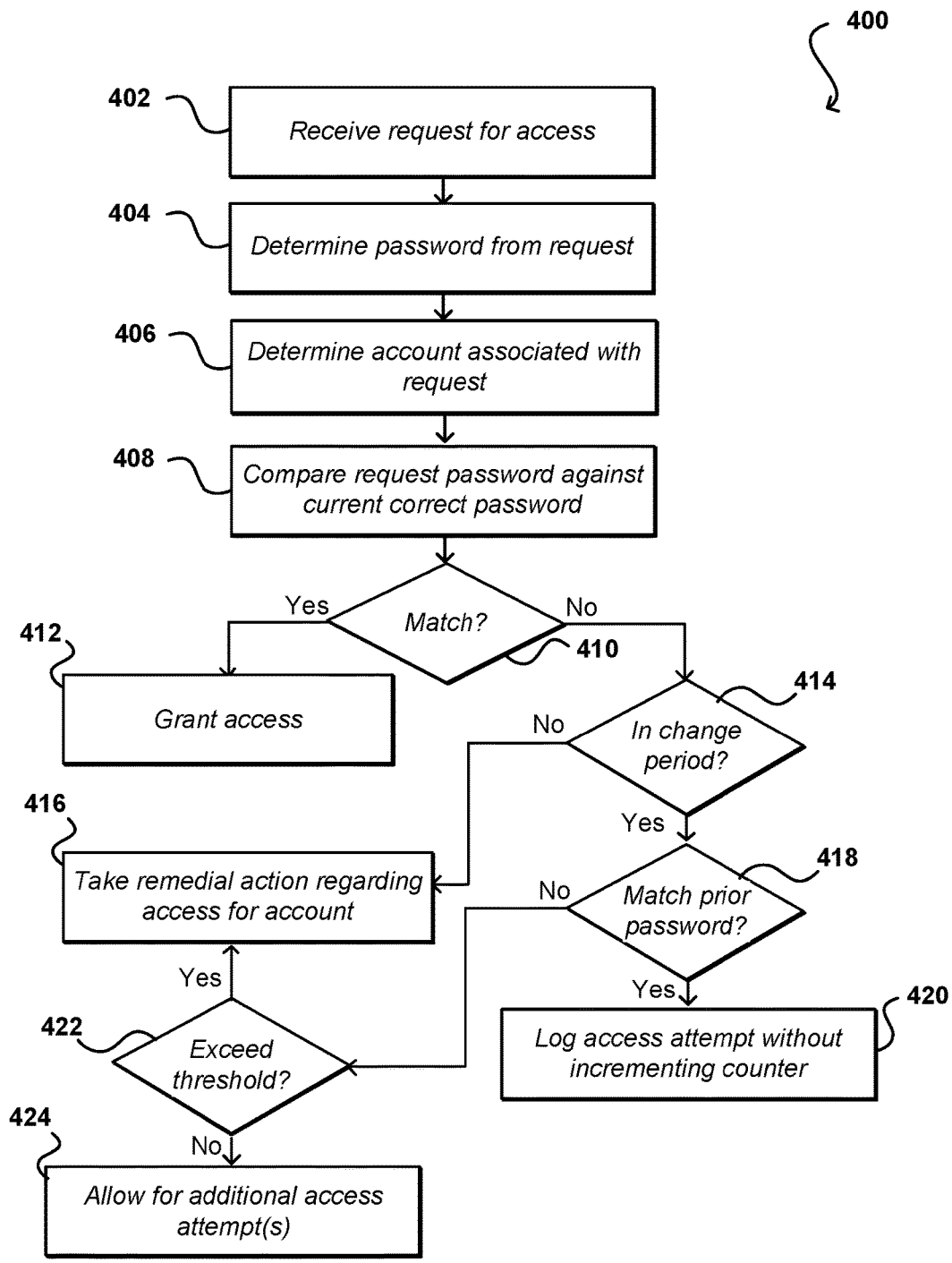
FIG. 4 illustrates an example process for determining whether a request qualifies as an incorrect password attempt for lockout purposes that can be utilized in accordance with various embodiments.

FIG. 4 illustrates another example process 400 that can be utilized in accordance with various embodiments. In this example, the received password is compared to one or more previous passwords for an account in order to determine how to process an incorrect password request. A request is received 402 that includes a password (or other such credential) to be used in obtaining access under a corresponding account. The password can be determined 404 from the request and an account associated with the request can be determined 406 as discussed previously. The request password can be compared 408 to the current password for the account to determine whether the passwords match. If the passwords match 410, the access can be granted 412 for the request.

If the passwords do not sufficiently match, a determination can be made 414 (separately or as part of the previous determination) as to whether the request with the incorrect password was received within a password change period, or other such period of time after the password was last set, changed, or updated. If the request was received outside such a period of time, one or more remedial actions can be taken 416. This can include, for example, updating (i.e., incrementing or decrementing) an incorrect attempt counter if the number of attempts is below the current threshold or locking the account if the number of attempts meets or exceeds the current threshold, among other such options. The length of the period of time can vary between embodiments, and can also vary based upon the number of correct or incorrect attempts received, among other such factors. If the request was received within such a period of time, a determination can be made 418 as to whether the incorrect password matches the prior correct password, or one of a set of previously correct or valid passwords in at least some embodiments. If so, the request can be processed 420, such as to log (or not log) the attempt as an incorrect attempt but not update an incorrect attempt counter or other such mechanism, at least for purposes of locking the account or performing another such action. In cases where a counter is incremented for incorrect attempts, such an attempt would not cause the counter to be incremented, whereby another attempt to log into the account can be processed. If the incorrect password does not match the previously valid password, a determination can be made 422 as to whether the number of incorrect attempts over the period exceeds the incorrect attempt threshold. If the number of incorrect attempts does not exceed the threshold, the account can remain open and additional attempts can be allowed 424. If, however, the number of incorrect attempts over the period exceeds the threshold, then one or more remedial actions can be taken 416 as discussed elsewhere herein. As discussed elsewhere herein, there can be different types of incorrect password thresholds utilized that include different parameters or threshold values. In some embodiments a threshold can be utilized that includes two or more parameters, as may include a maximum number of incorrect password submissions and a maximum number of submissions of a previously correct password, among other such options.

Figure 5:
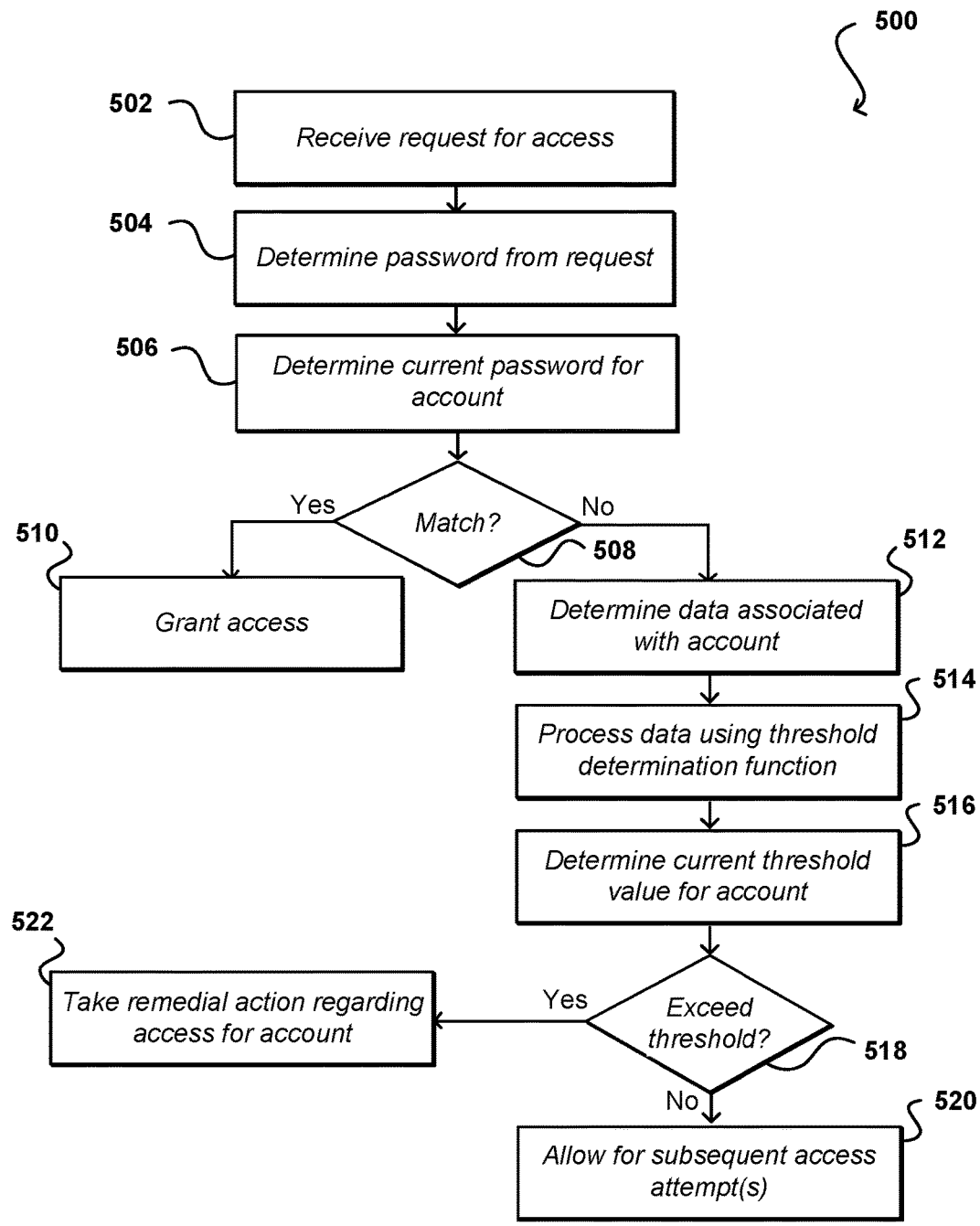
FIG. 5 illustrates an example process for determining a lockout threshold based at least in part upon a number of correct attempts and an amount of time since a password change, which can be utilized in accordance with various embodiments.

FIG. 5 illustrates another example process 500 that can be utilized in accordance with various embodiments. In this example, a login function is utilized to dynamically determine the number of incorrect attempts that can be allowed at a given time. A request is received 502 that includes a password (or other such credential) to be used in obtaining access under a corresponding account. The password can be determined 504 from the request and current password for an account associated with the request can be determined 506 as discussed previously. A determination can be made 508 as to whether the request password matches the current password for the account. If the passwords are determined to match, the access can be granted 510 for the request.

If the passwords are determined to not sufficiently match, data associated with the account can be determined 512 and that data processed 514 using a threshold determination function to determine the current incorrect attempt threshold to use with respect to the account and type of access requested. For example, one threshold determination function looks to the number of correct password attempts received since the last password change to determine a current number of allowed password attempts over a period of time. The current incorrect attempt threshold value is determined 516, and a determination made 518 as to whether the current number of incorrect attempts received exceeds that threshold. If not, the account can remain unlocked so as to allow 520 for subsequent access attempts to be received and processed. If the number of incorrect attempts exceeds the current threshold, as determined dynamically using the function, one or more remedial actions can be taken 522.

Figure 6A:
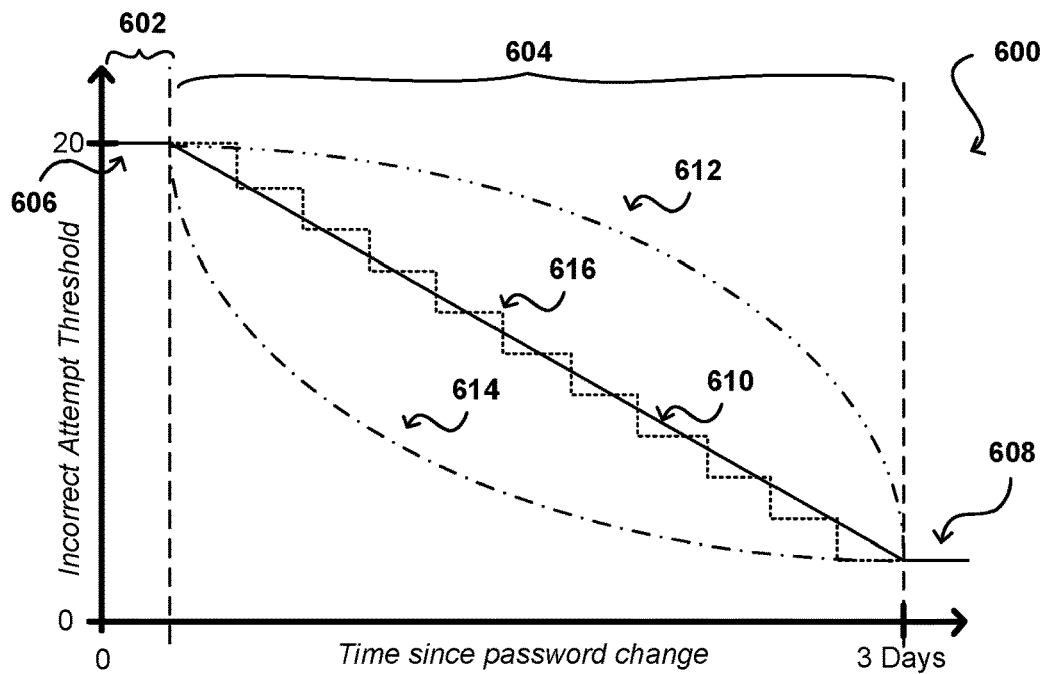
FIGS. 6A and 6B illustrate example lockout threshold functions that can be utilized in accordance with various embodiments.
Figure 6B:
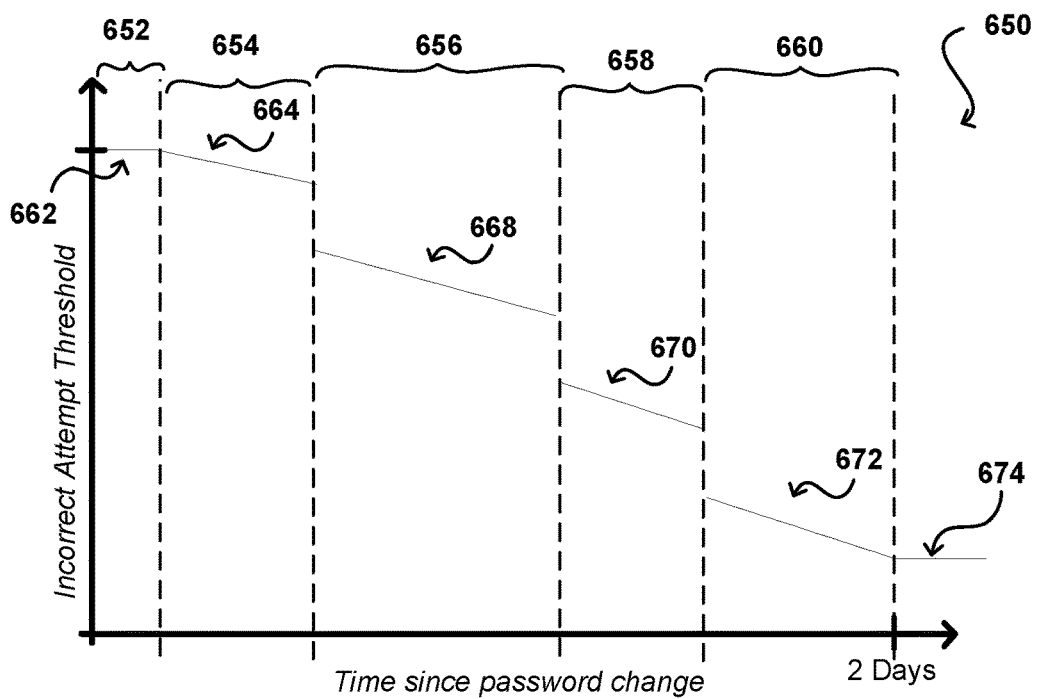

FIGS. 6A and 6B illustrate example threshold determination functions that can be utilized in accordance with various embodiments. In the threshold determination function 600 illustrated in FIG. 6A, the incorrect attempt threshold 606 might be set such that a user gets twenty incorrect password attempts by default after a password change occurs (here at time 0), at least for a determined initial period of time 602. This number might be relatively large for a number of reasons, such as where devices will not quickly and automatically receive the new password, the user might forget what he or she selected as the new password, etc. If a correct password attempt is received, however, this may reduce the number of incorrect attempts that are allowed over a period of time as discussed elsewhere herein. As time passes, the threshold value might decrease over a second period of time 604 from the end of the initial period to a final period, after which a set incorrect attempt threshold 608 applies, such as three attempts over a determined window of time, such as one minute. During an intermediate period of time 604, the incorrect attempt threshold value can decrease in a number of different ways. For example, according to a first function 610 the threshold decreases linearly, with the current value being rounded as appropriate to an integer number of attempts (except in embodiments where incorrect attempts may not count as full attempts, such as where the password matches a previously correct password value). A second type of function can cause the threshold value to decrease exponentially, either to cause the password threshold to drop relatively quickly according to a first exponential function 614 or more slowly at first according to a second exponential function 612. In another approach a step function 616 may be used that sets different integer values over time. Various other approaches can be used as well within the scope of various embodiments.

In the threshold determination function 650 illustrated in FIG. 6B, the incorrect attempt threshold might be a function of the number of correct password attempts since the most recent password change, in some embodiments after at least one correct password attempt is received. For example, over an initial period of time 652 the threshold value 662 might be a fixed amount or might decrease at a determined rate until a first correct password attempt is received. After a first correct password attempt is received, the threshold value might start to decrease according to a certain function over a period of time, such as for a first linear decrease 664 over a period of time 654 after the first correct password attempt. After a second correct password attempt, the threshold value might drop by a certain amount, such as a fractional amount based at least in part upon the number of correct password attempts received since the last password change. Thus, over a next period 656 the threshold value 668 might start at a lower value due to the correct password being received, then decrease according to a function that might be the same as, or different from, that for the prior period 654. The process can continue for subsequent periods of time 658, 660 each time a correct password is received for the respective access. It should be understood that in some embodiments this can include correct attempts from any source, while in others it can include attempts from the same or different users, devices, etc. After some determined period of time and/or number of correct attempts, the value of the function 674 will reach a determined value, such as three incorrect attempts over a two minute window, and can remain at that value unless manually changed by an authorized person or process. Various other functions and combinations of correct and/or incorrect attempts can be used to adjust the incorrect attempt threshold in accordance with various embodiments. For example, in some embodiments the threshold value can be divided by the number of correct attempts received until arriving at a minimum determined threshold value. As mentioned, in some embodiments there might be no limit on the number of incorrect attempts until at least one correct login attempt is received, at least within a specified period of time of a password change, such as within an hour, a day, two days, etc. In some embodiments the amount of time passed may not be taken into account, other than reverting to the determined threshold value after a period of time. During that period of time, a change in threshold value may be based solely upon the number of correct (and/or incorrect) password attempts.

As mentioned, when a received request results in a number of incorrect password attempts meeting or exceeding a current incorrect attempt threshold, various remedial actions can be performed, as may include a lockout of access for at least a period of time. As in prior approaches, a lockout can be managed in any of a number of different ways. For example, in some embodiments a lockout might be for a determined period of time, such as an hour or twenty-four hours. In other embodiments, an account lock might need to be manually released or unlocked, such as by a system administrator or other such entity. In some embodiments, an initial lockout or number of lockouts might be for a determined period of time each, either the same amount of time or increasing lengths of time, among other such options. After a determined number of lockouts, such as three lockouts overall or over a period of time, the account might be locked in such a way that a manual review and unlock is required. The number of lockouts allowed can also vary by period of time, time since last password change, or other such option. Various other unlock procedures can be utilized as well, such as for the user to provide additional validation and/or credentials, further update password information, and the like.

In some embodiments, user history data can also be used in determining the appropriate thresholds and/or functions to use for access management. For example, a first user might very rarely enter an incorrect password. Accordingly, a relatively low threshold value might be used for that user to attempt to better prevent unauthorized access. A second user might frequently enter an incorrect password. The threshold value for that user might thus be higher, as the user will be more likely to innocently enter incorrect passwords. While this can potentially increase the risk of unauthorized access, it can also minimize the number of times the user is locked out of an account due to forgetting the current password. The ranges of threshold values can vary by embodiment, and in at least some embodiments can be configured by an administrator or system security team, etc. The thresholds can also be adaptive over time, such that as the user's behavior changes the setting of the thresholds can update accordingly. Thresholds can also vary based upon other factors as well, such as roles, permissions, types of access, and the like. Different behaviors of a user might be considered as well. For example, one user might frequently type incorrect passwords while another user might frequently type old passwords that are no longer valid, but were at one time. For each of these types of users, the thresholds might be set differently for incorrect passwords than expired passwords, or other such values. Thus, threshold values in at least some embodiments can be set on an individual level, as well as potentially on the level of type of user, user group, etc. Various other time intervals can be utilized as well in other embodiments. For example, instead of the amount of time that has passed since a password change, some embodiments can look to the amount of time since the last successful and/or unsuccessful password authentication.

In some embodiments the thresholds, functions, and/or other such aspects used for authentication can be tunable by an administrator or other such entity. For example, an administrator might be able to select the functions, set the time period, and/or adjust the threshold used for any of a number of different situations. In other embodiments, there might be a tunable dial, knob, or setting that an administrator can select. For example, an administrator might be able to select a security setting of "one" that utilizes the least restrictive settings up to a value of "ten," which can apply the most restrictive settings. In some embodiments such knobs can be used for individual settings or groups of settings as well.

Various types of systems or deployments can utilize approaches discussed herein. For example, access management approaches in accordance with various embodiments could be used with any system, service, or component for which an access determination is to be made based on a credential, and where that credential is subject to change over time and subject to a lockout policy around password rotation. The process is particularly useful for credentials (e.g., passwords or personal identification numbers (PINs)) that are human-memorized and entered into a system to obtain access, although approaches discussed herein can be used to manage credentials such as hash-based message authentication code (HMAC) or RSA signatures, among others. This could include, for example, a data storage service, an enterprise environment, an active directory offering, and the like. Such functionality can also be provided as a third party service as discussed elsewhere herein, where users of resources (e.g., electronic and/or computing resources) of a resource provider must have their credentials authenticated by the third party service. Administrators of the resource environment can configure various policies and rules that can affect the functions and/or thresholds used with access management. The approaches also can be used at various levels in the environment, such as at the account level or user login level, among others.

Figure 7:
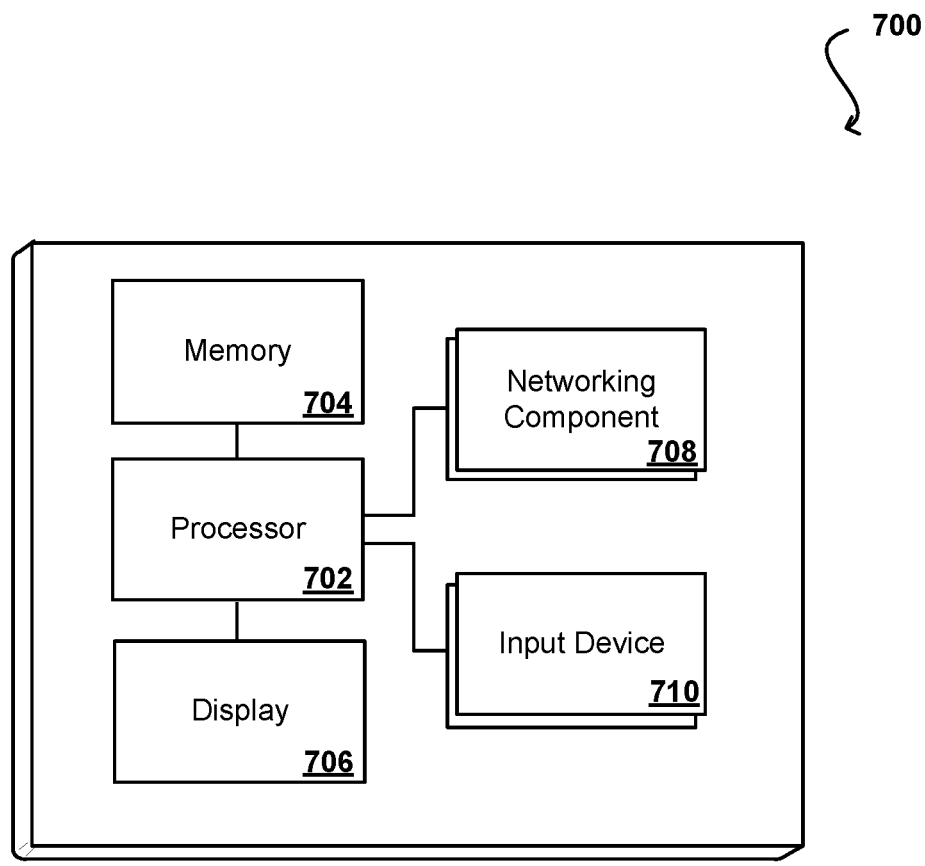
FIG. 7 illustrates example components of a computing device that can be used to implement aspects of various embodiments.

FIG. 7 illustrates a set of basic components of an example computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device typically will include one or more networking components 708, such as a port, network interface card, or wireless transceiver that enables communication over at least one network. The device can include at least one input device 710 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one processor;
   a computing resource; and
   memory including instructions that, when executed by the at least one processor, cause the system to:
   set an incorrect attempt threshold to a first value;
   determine a correct submission of a current password associated with an account to access the computing resource;
   set, based at least in part upon the correct submission of the current password, the incorrect attempt threshold to a second value that is less than the first value by an amount of decrease, the amount of decrease being determined using an exponential function of a number of correct submissions of the current password;
   receive a number of incorrect passwords for the account; and
   lock access to the computing resource based at least in part on a determination that the number of incorrect passwords received for the account exceeds the incorrect attempt threshold.

2. The system of claim 1, wherein the exponential function is one from: a first exponential function that decreases the incorrect attempt threshold at a first speed and a second exponential function that decreases the incorrect attempt threshold at a second speed that is slower than the first speed.

3. The system of claim 1, wherein the memory including instructions that, when executed by the at least one processor, further cause the system to:
   after determining a correct submission of a current password, receive a request requiring access to the computing resource provided by a resource provider, the request including a request password and being associated with the account of a customer of the resource provider.

4. The system of claim 3, wherein the memory including instructions that, when executed by the at least one processor, further cause the system to:
   determine that the request password corresponds to a previously correct password for access to the computing resource associated with the account; and
   prevent the request password from being counted in the number of incorrect passwords.

5. The system of claim 1, wherein the memory including instructions that, when executed by the at least one processor, further cause the system to:
   set the incorrect attempt threshold to a fixed value after a period of decreasing incorrect threshold values.

6. The system of claim 1, wherein the memory including instructions that, when executed by the at least one processor, further cause the system to:
   before determining a correct submission of a current password, receive a request requiring access to the computing resource provided by a resource provider, the request including a request password that is different from the current password.

7. A computer-implemented method, comprising:
   under control of one or more processors configured to execute instructions,
   setting an incorrect attempt threshold to a first value;
   determining a correct submission of a current password associated with an account to access a computing resource;
   setting, based at least in part upon the correct submission of the current password, the incorrect attempt threshold to a second value that is less than the first value by an amount of decrease, the amount of decrease being determined using an exponential function of a number of correct submissions of the current password;
   receiving a number of incorrect passwords for the account and
   locking access to the computing resource based at least in part on a determination that the number of incorrect passwords received for the account exceeds the incorrect attempt threshold.

8. The computer-implemented method of claim 7, further comprising:
   after determining a correct submission of a current password, receiving a request requiring access to the computing resource provided by a resource provider, the request including a request password and being associated with the account of a customer of the resource provider.

9. The computer-implemented method of claim 8, further comprising:
   determining that the request password is part of a request for access to the computing resource and that the request password corresponds to a previously correct password for access to the computing resource associated with the account; and
   preventing the request password from being counted in the number of incorrect passwords.

10. The computer-implemented method of claim 7, wherein
    the number of correct submissions of the current password is a number of submissions of the current password since the current password was set.

11. The computer-implemented method of claim 7, further comprising:
    setting the incorrect attempt threshold to a fixed value after a period of decreasing incorrect threshold values.

12. The computer-implemented method of claim 7, wherein the amount of decrease is determined based at least in part on a determination that the account is associated with at least: one of a type of user, a type of user account, a type of the computing resource, or a type of access for the request.

13. The computer-implemented method of claim 12, further comprising:
    enabling an administrator of the computing resource to select a security setting for the computing resource, wherein the amount of decrease is based at least in part on the security setting.

14. The computer-implemented method of claim 7, wherein the computing resource includes at least one of a computer or a data storage resource.

15. The computer-implemented method of claim 7, wherein the exponential function is one from: a first exponential function that decreases the incorrect attempt threshold at a first speed and a second exponential function that decreases the incorrect attempt threshold at a second speed that is slower than the first speed.

16. The computer-implemented method of claim 7, further comprising:
    removing a lock applied to the computing resource during the locking of the access to the computing resource;

receiving a request for access to the computing resource, the request associated with the account and comprising a request password for access to the computing resource;

determining that the request password differs from the current password;

determining a length of time that has passed since the current password was set for the account;

setting the incorrect attempt threshold to a third value based at least in part upon the length of time; and locking access for the account for a least a period of time in response to the receipt of the request password causing the number of incorrect passwords to exceed the third value.

17. A non-transitory computer-readable storage medium storing instructions that, when executed by at least one processor of a computer system, cause the computer system to:

set an incorrect attempt threshold to a first value;

determine a correct submission of a current password associated with an account to access a computing resource;

set, based at least in part upon the correct submission of the current password, the incorrect attempt threshold to a second value that is less than the first value by an amount of decrease, the amount of decrease being determined using an exponential function of a number of correct submissions of the current password; and lock access to the computing resource based at least in part on a determination that the number of incorrect passwords received for the account exceeds the incorrect attempt threshold.

18. The non-transitory computer-readable storage medium of claim 17, wherein the exponential function is one from: a first exponential function that decreases the incorrect attempt threshold at a first speed and a second exponential function that decreases the incorrect attempt threshold at a second speed that is slower than the first speed.

19. The non-transitory computer-readable storage medium of claim 17, wherein the instructions, when executed by the at least one processor of the computer system, further cause the computer system to:

after determining a correct submission of a current password, receive a request requiring access to the computing resource provided by a resource provider, the request including a request password and being associated with the account of a customer of the resource provider.

20. The non-transitory computer-readable storage medium of claim 19, wherein the instructions, when executed by the at least one processor of the computer system, further cause the computer system to:

determine that the request password corresponds to a previously correct password for access to the computing resource associated with the account; and prevent the request password from being counted in the number of incorrect passwords.

* * * * *